(12) United States Patent
Hines et al.

(10) Patent No.: US 9,551,374 B2
(45) Date of Patent: Jan. 24, 2017

(54) CRANKSHAFT

(71) Applicant: V&H PERFORMANCE, LLC, Santa Fe Springs, CA (US)

(72) Inventors: Byron Hines, Avon, IN (US); Raphael Paula, Indianapolis, IN (US)

(73) Assignee: V&H PERFORMANCE, LLC, Santa Fe Springs, CA (US)

(*) Notice: Subject to any disclaimer, the term of this patent is extended or adjusted under 35 U.S.C. 154(b) by 0 days.

(21) Appl. No.: 14/637,010

(22) Filed: Mar. 3, 2015

(65) Prior Publication Data

US 2015/0247526 A1 Sep. 3, 2015

Related U.S. Application Data

(60) Provisional application No. 61/947,298, filed on Mar. 3, 2014.

(51) Int. Cl.
| | |
|---|---|
| *F16C 3/04* | (2006.01) |
| *F16C 3/14* | (2006.01) |
| *F16C 3/10* | (2006.01) |
| *F16C 17/04* | (2006.01) |
| *F16C 33/10* | (2006.01) |

(52) U.S. Cl.
CPC . *F16C 3/14* (2013.01); *F16C 3/10* (2013.01); *F16C 17/04* (2013.01); *F16C 33/1065* (2013.01); *Y10T 74/2185* (2015.01)

(58) Field of Classification Search
CPC .............. F16C 3/06; F16C 3/10; F16C 3/14; F16C 9/04
See application file for complete search history.

(56) References Cited

U.S. PATENT DOCUMENTS

| 767,877 A | * | 8/1904 | Fleming | F16C 3/14 74/605 |
|---|---|---|---|---|
| 6,164,159 A | * | 12/2000 | Saker | F16C 9/04 123/197.4 |
| 2012/0031367 A1 | * | 2/2012 | Dunlavey | F01M 1/08 123/196 M |

FOREIGN PATENT DOCUMENTS

| DE | WO 2009049652 A1 | * | 4/2009 | ............... F16C 3/14 |
|---|---|---|---|---|
| JP | 2012007664 A | * | 1/2012 | |

* cited by examiner

*Primary Examiner* — Vicky Johnson
(74) *Attorney, Agent, or Firm* — Barnes & Thornburg LLP

(57) ABSTRACT

A crankshaft having an axis of rotation is disclosed. The crankshaft includes a main throw having a web, a main pin extending from the web that is coaxial with the axis of rotation and an aperture in the web. The crankshaft also includes a crank throw having a web, a crank pin extending from the web, a central aperture positioned in the web that is coaxial with the axis of rotation. The crank pin is positioned in the aperture of the main throw and a connecting rod is positioned on the crank pin. The crankshaft includes various features for distribution of oil to components.

7 Claims, 9 Drawing Sheets

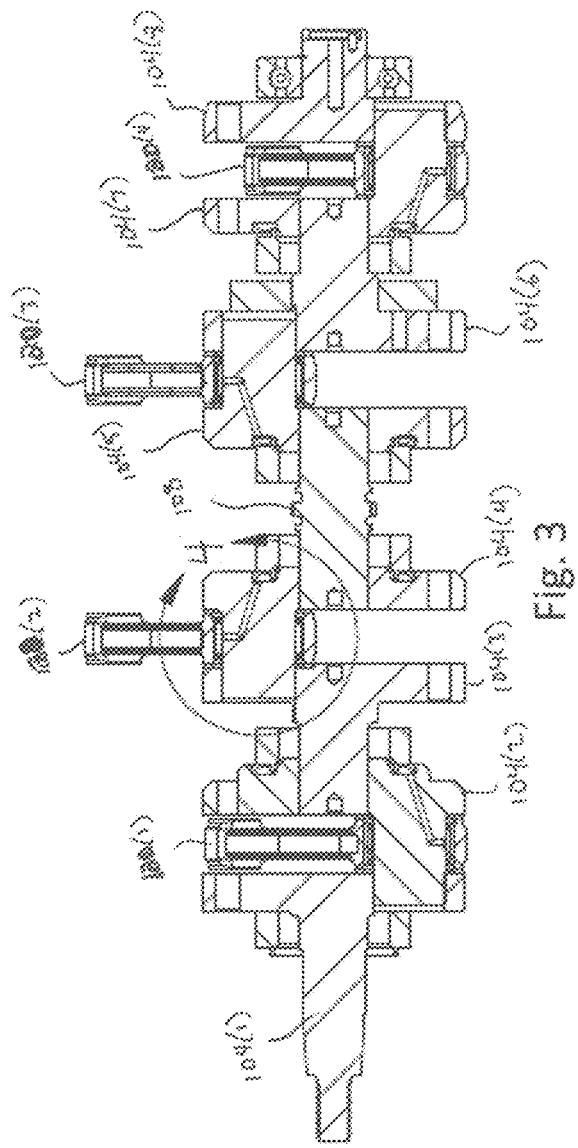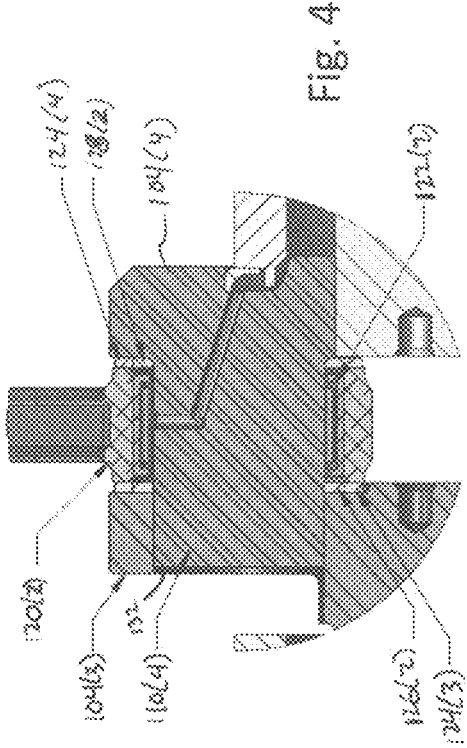

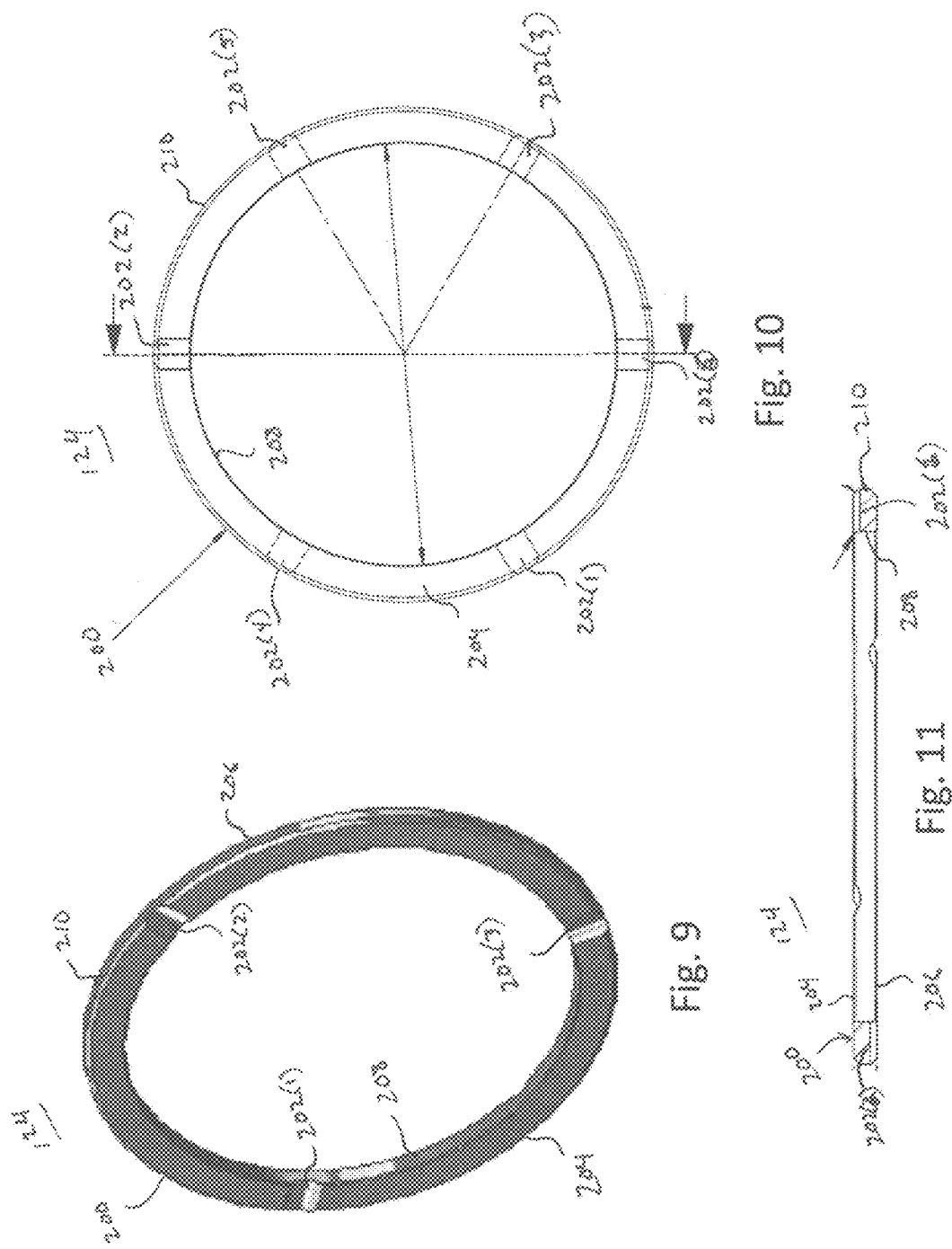

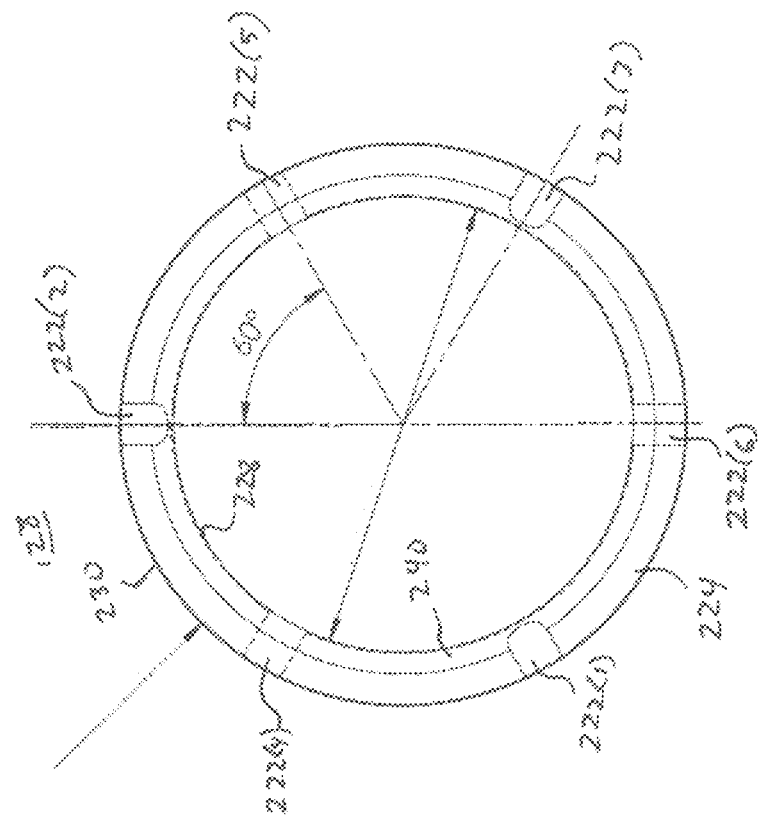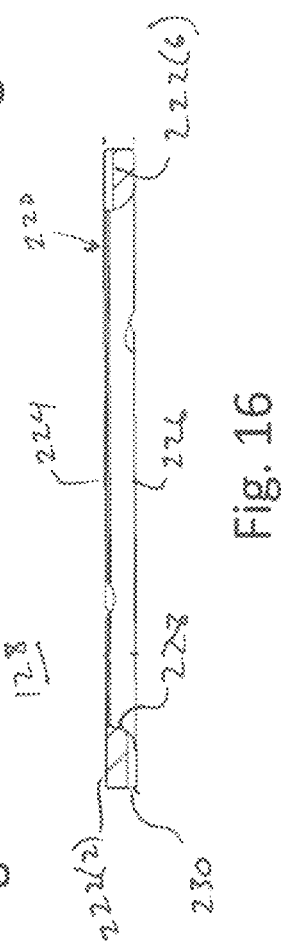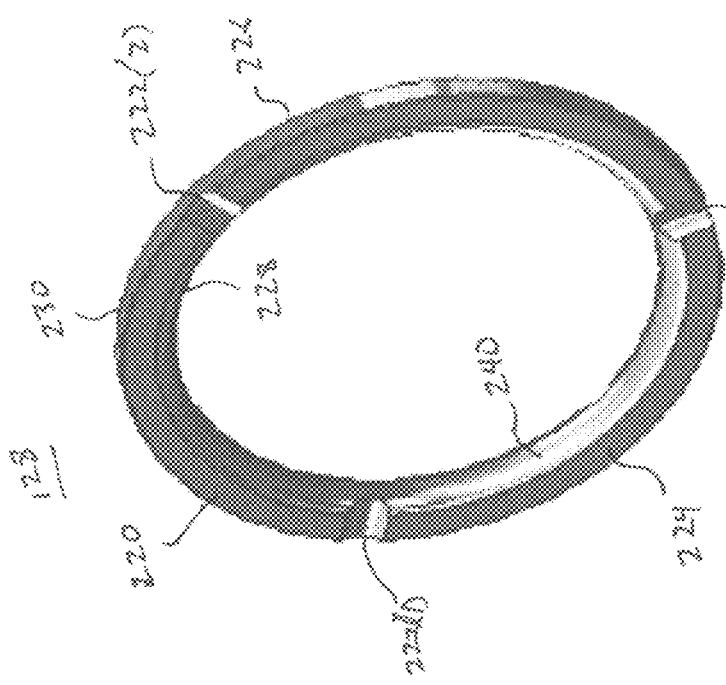

CRANKSHAFT

INTRODUCTION

Crankshafts are a primary component of internal combustion engines, translating linear motion into rotational motion. Described and illustrated herein is an example crankshaft that includes example features for improved crankshaft performance, for example by providing distribution of oil to components of the crankshaft. The crankshaft has an axis of rotation is disclosed. The crankshaft includes a main throw having a web, a main pin extending from the web that is coaxial with the axis of rotation and an aperture in the web. The crankshaft also includes a crank throw having a web, a crank pin extending from the web, a central aperture positioned in the web that is coaxial with the axis of rotation. The crank pin is positioned in the aperture of the main throw and a connecting rod is positioned on the crank pin.

BRIEF DESCRIPTION OF THE DRAWINGS

FIG. 3 is a cross sectional view of the crankshaft of FIG. 1 taken along a line perpendicular to an axis of rotation for the crankshaft.

FIG. 4 is a close up sectional view of a portion of the crankshaft shown as circle 4 in FIG. 3.

FIG. 9 is an isometric view of an outer thrust washer.

FIG. 10 is a plan view of the outer thrust washer of FIG. 9.

FIG. 11 is a cross sectional view of the outer thrust washer of FIG. 9.

FIG. 14 is an isometric view of an inner thrust washer.

FIG. 15 is a plan view of the inner thrust washer of FIG. 14.

FIG. 16 is a cross sectional view of the inner thrust washer of FIG. 14.

DETAILED DESCRIPTION

Figure 1:
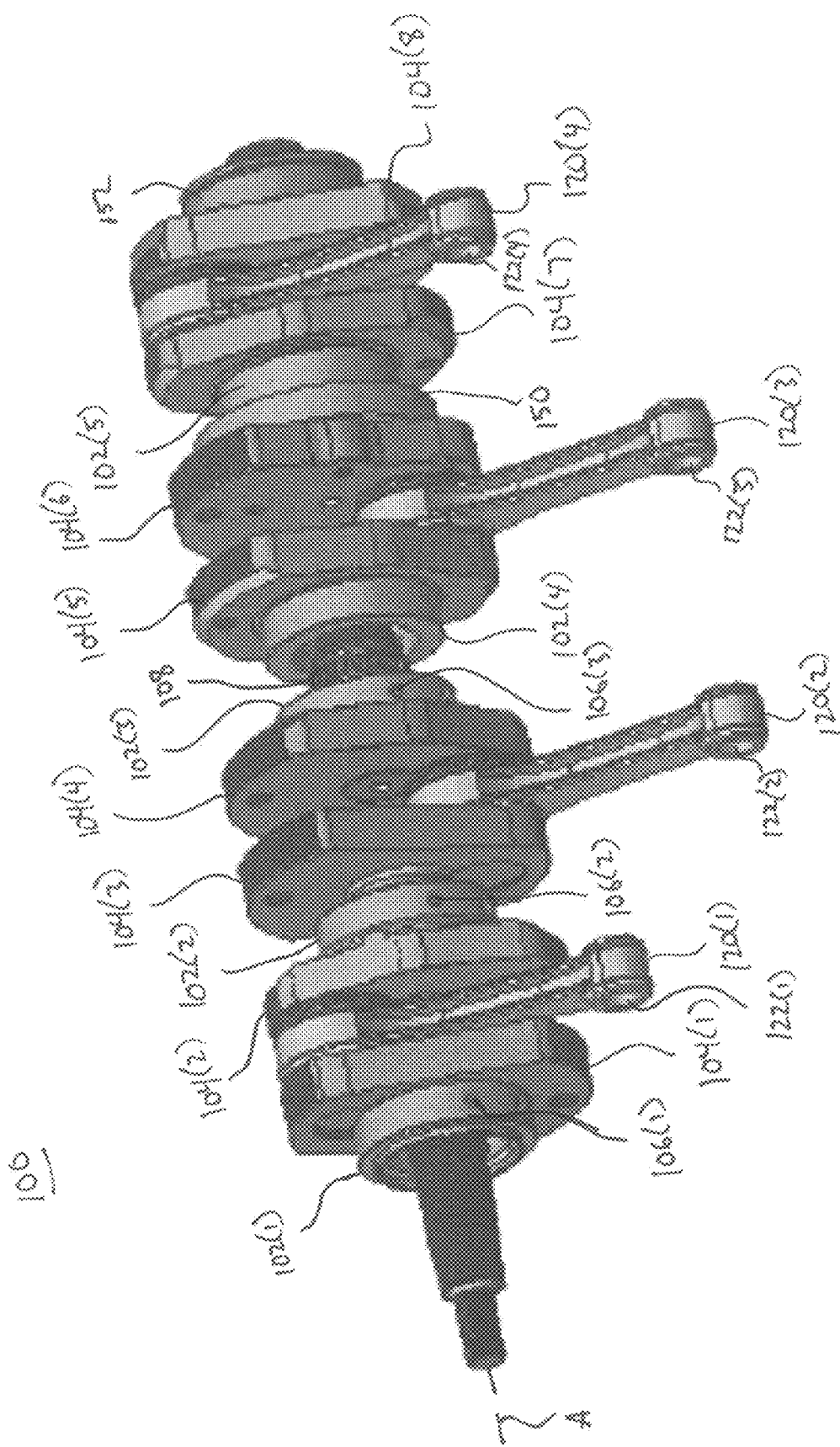
FIG. 1 is an isometric view of a crankshaft.
Figure 2:
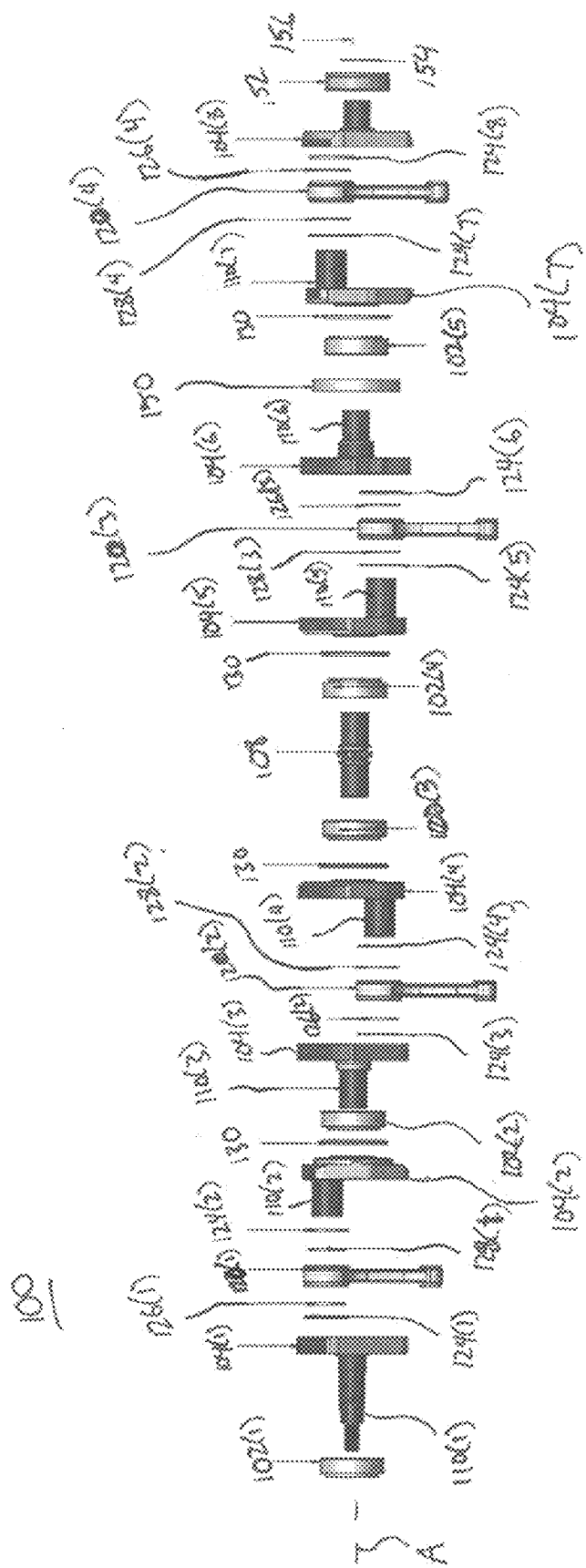
FIG. 2 is an exploded view of the crankshaft of FIG. 1.

FIG. 1 is a perspective view of an exemplary crankshaft 100 and FIG. 2 is an exploded view of crankshaft 100. One example crankshaft embodying concepts presented herein is sold by Vance & Hines of Santa Fe Springs, Calif. The crankshaft 100, in one embodiment, can be formed of a billet. In one example, the billet is made from 8620 premium-grade aircraft quality/bearing quality alloy steel. If desired, crankshaft 100 can be heat-treated and carburized for increased tensile strength and hardness so as to withstand the demands of high horse-power (e.g., 375 hp), high-revving RPM (e.g., 14,000+ RPM) engines.

During operation, the crankshaft 100 is positioned within a crankcase (not shown) that includes an oil sump positioned in the bottom of the crankcase and an oil delivery system operating to deliver oil to components of the crankshaft 100. As illustrated in FIGS. 1 and 2, the crankshaft includes five roller main bearings 102(1)-(5) that define an axis of rotation A for the crankshaft 100. Although five roller main bearings are illustrated, any number of bearings can be utilized as desired in alternative embodiments. These roller main bearings 102 are positioned throughout a length of the crankshaft 100 and provide rotational support for throws 104(1)-(8). The roller main bearings 102 can include an outer race, inner race and rolling elements to provide rotational support for the throws 104. In addition, in one embodiment, the roller main bearings 102 can include one or more fluid ports 106 (e.g., port 106(1) on bearing 102(1)) that receive and distribute oil to the throws 104. Upon rotation of the crankshaft 100, a portion of the throws 104 come into contact with oil in the sump. In one embodiment, at least some of the throws 104 include features that distribute the oil to components of the crankshaft 100.

Throws 104 for the crankshaft 100 can be formed in various manners as desired. In the embodiment illustrated, the throws 104 each include a pin and a web that defines an aperture and a counterweight. The aperture in each web is configured to receive either a crank pin of an adjacent throw or a center pin 108. The center pin 108 is coaxial with the roller main bearings 102 and operates to couple together throws 104(4) and 104(5).

Throws 104(1), (3), (6) and (8) can be referred to as main throws, having a corresponding connecting pin 110(1), (3), (6) and (8) (also referred to as a main pin) that is coaxial with the roller main bearings 102. As discussed in more detail below with respect to FIGS. 5A-5C, the main throws 104(1), (3), (6) and (8) include an oil slinger passage (also can be referred to as oil channel groove) that can gather oil as the throw rotates (for example from an oil sump of a corresponding crankcase where the crankshaft is installed) and direct the oil to an aperture of the throw that receives a crank pin from an adjacent throw.

Throws 104(2), (4), (5) and (7) can be referred to as pin throws, having a corresponding connecting pin 110(2), (4), (5) and (7) (also referred to as a crank pin) that is axially offset with respect to the roller main bearings 102 and coupled with a corresponding connecting rod 120(1)-(4), connecting rod bearing 122(1)-(4), two outer thrust washers 124(1)-(8), a flat inner thrust washer 126(1)-(4) and a radius inner thrust washer 128(1)-(4). As discussed in more detail below with respect to FIGS. 6A-6B, 7 and 8, the pin throws 104(2), (4), (5) and (7) can include one or more oiling pin holes (also referred to as oiling channels) that deliver oil directly to a bearing surface of their respective crank pin 110(2), (4), (5) and (7). In one specific embodiment illustrated in FIG. 8, three oiling pin holes are provided to deliver oil to separate regions of the bearing surface of the corresponding crank pin.

Oil is delivered to the throws 104(2), (4), (5) and (7) through a corresponding oil slinger 130. Each oil slinger 130 is coupled to one of the crank throws 104(1), (3), (6) and (8) and receives oil from an adjacent roller main bearing 102. As discussed above, each roller main bearing 102 includes a port for receiving oil, which can then be delivered to the adjacent oil slinger 130. The oil slinger 130 operates to deliver oil to the corresponding crank pin oiling holes.

With further reference to the close up view of FIG. 4, crank pin 110(4) of throws 104(4) is positioned within an aperture 132 of adjacent main throw 104(3) and further supports connecting rod 120(2), two outer thrust washers 124(3) and (4), flat inner thrust washer 126(2) and radius inner thrust washer 128(2). It will be appreciated that arrangement of the components illustrated in FIG. 4 is similar for the other throws within crankshaft 100. More specifically, connection of throws 104(3) and (4) and corresponding components for the throws are similar for connection of throws 104(1) and (2), throws 104(5) and (6) and throws 104(7) and (8). For crank pin 110(4) (and other crank pins), the inner thrust washers 126(2) and 128(2) are positioned on either side of the connecting rod 122(2) and coaxially positioned within the outer thrust washers 124(3) and (4), respectively, where the outer thrust washers 124(3) and (4) are positioned adjacent respective inner thrust washers 126(2) and 128(2) such that each respective inner thrust washer 126(2) and 128(2) is positioned between the connecting rod 122(2) and the respective outer thrust washer 124(3) and (4). Upon final assembly, each outer thrust washer 124(3) and (4) bears against the connecting rod 122(2), whereas each inner thrust washer 126(2) and 128(2) bears against a connecting rod bearing 134 positioned between the connecting rod 122(2) and a bearing surface 136 of the crank pin 110(4). With this arrangement, the inner (126(2) and 128(2)) and outer (124(3) and (4)) washers are able to rotate at different rates about the bearing surface 136 of the crank pin 110(4). In particular, each outer washer 124(3) and (4) rotates at the same rate as the adjacent connecting rod 122(2), whereas each inner washer 126(2) and 128(2) rotates at the same rate as the adjacent connecting rod bearing 134.

As discussed below with respect to FIGS. 9-11, each outer thrust washer 124 includes a plurality of grooves (or channels) that allow for improved oil flow as well as reduce drag and surface friction between adjacent surfaces. In a similar manner with respect to FIGS. 12-16, each of the inner thrust washers 126, 128 include a plurality of grooves (or channels) that allow for improved oil flow as well as reduce drag and surface friction between adjacent surfaces.

Upon final assembly of the crankshaft, as illustrated in the isometric view of FIG. 1, and with further reference to FIG. 2, a primary gear 150 is coupled to the pin 110(6) for throw 104(6) and positioned between throws 104(6) and (7). The primary gear 150 provides rotational output to a chain or other mechanism (not shown) coupled with the primary gear 150. Adjacent throw 104(8) and at one end of the crankshaft 100, a ball main bearing 152, snap ring 154 and ignition cap 156 are coupled to the pin 110(8) of throw 104(8) to secure assembly of the crankshaft 100.

Figure 5C:
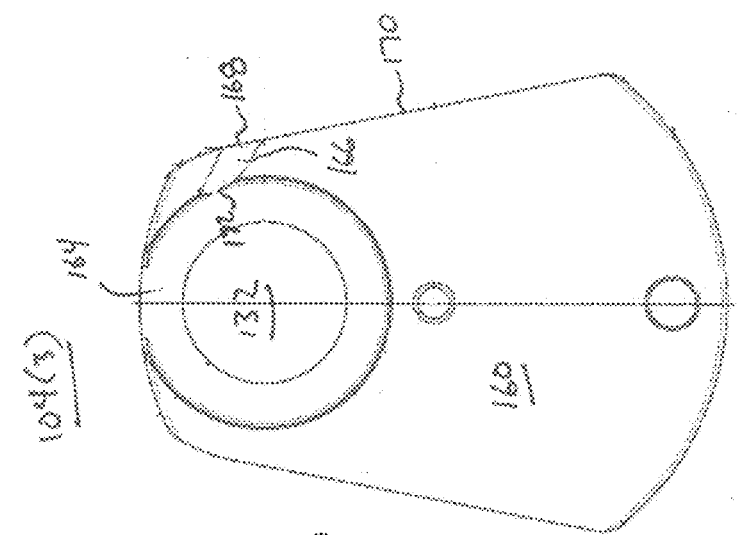
FIG. 5C is a plan view of the pin throw of FIGS. 5A and 5B.
Figure 5B:
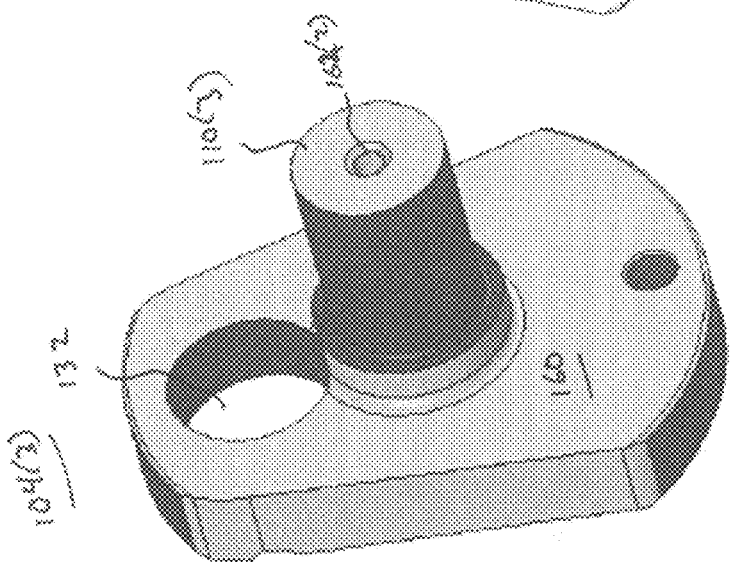
FIGS. 5A and 5B are isometric views of a main throw of the crankshaft of FIG. 1.
Figure 5A:
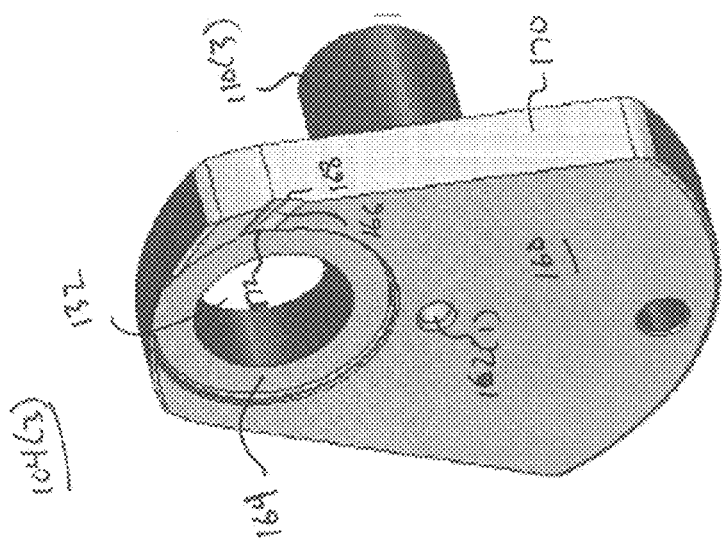

Main throw 104(3) is illustrated in detail in FIGS. 5A-5C. Throw 104(3) includes centrally located main pin 110(3) extending from a web 160 along the axis of rotation for the crankshaft 100. The pin 110(3) is coupled with throw 104(2) and supports roller main bearing 102(2) and oil slinger 130. The pin 110(3) includes bores 162(1) and (2) at either end that are utilized for horizontal location (augmenting positional accuracy during machining) Offset from the pin 110(3) and positioned in the web 160 is aperture 132 that receives the crank pin 110(4) of throw 104(4) as referenced and discussed with respect to FIG. 4. On a side of the web facing throw 104(4), an annular recess 164 surrounds the aperture 132 and maintains inner thrust washer 126(2) and outer thrust washer 124(3) therein.

Coupled with the annular recess 164 and positioned to one side of the annular recess 164 is an oil channel groove 166. The oil channel groove is tapered from a larger outer opening 168 facing an outer side surface 170 of the web 160 and channeling oil to a smaller inner opening 172 facing the annular recess 164. During operation and as the throw 104(3) rotates, oil from the oil sump of the crankcase will enter the outer opening 168 and be channeled into the annular recess 164 through the inner opening 172. From the annular recess 164, oil can then be distributed to adjacent inner and outer thrust washers as well as the connecting rod 122(2) and connecting rod bearing 134. This distribution of oil can improve lubrication to components supported by the crank pin 110(3), ultimately decreasing heat generation of these components and reducing drag and friction for these components. Throw 104(3) further includes a bore positioned on an opposite end of the aperture with respect to the main pin, functioning to horizontally locate the main throw (augmenting positional accuracy during machining). Similar features discussed above and illustrated in FIGS. 5A-5C with regard to main throw 104(3) can be applied to the other main throws 104(1), (6) and (8), as desired.

Figure 6B:
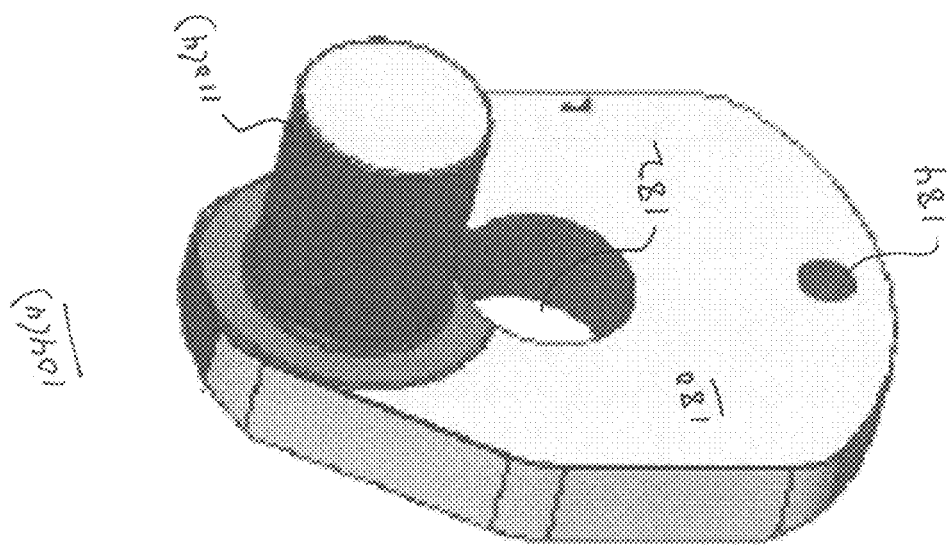
FIGS. 6A and 6B are isometric views of a crank throw of the crankshaft of FIG. 1.
Figure 6A:
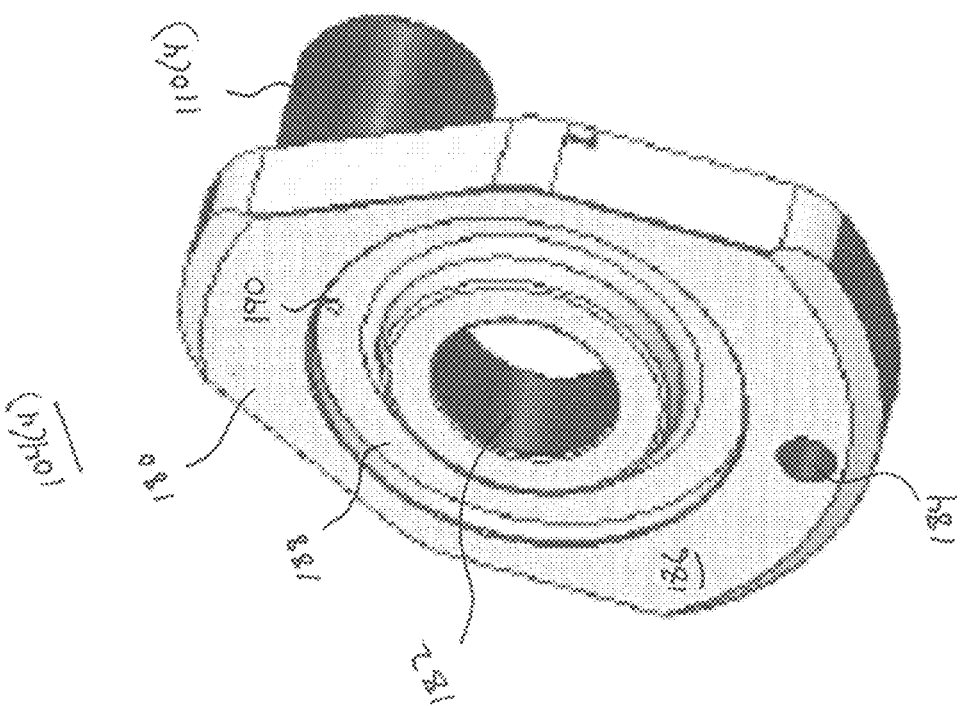

Crank throw 104(4) is illustrated in FIGS. 6A and 6B. The throw 104(4) includes a web 180 with a central aperture 182 coaxial with the axis of rotation A of the crankshaft 100 and a crank pin 110(4) offset with respect to the aperture 182 as discussed above. The central aperture 182 receives the center pin 108 of the crankshaft 110, which supports roller main bearing 102(3) and an oil slinger 130. The crank pin 110(4) extends from the web 180 and is coupled with aperture 132 of throw 104(3). Throw 104(4) further includes a bore 184 positioned on an opposite end of the pin with respect to the central aperture 182, functioning to horizontally locate the pin throw 104(3) (augmenting positional accuracy during machining). Similar features discussed above and illustrated in FIGS. 6A-6C with regard to crank throw 104(4) can be applied to the other crank throws 104(2), (5) and (7), as desired.

Figure 7:
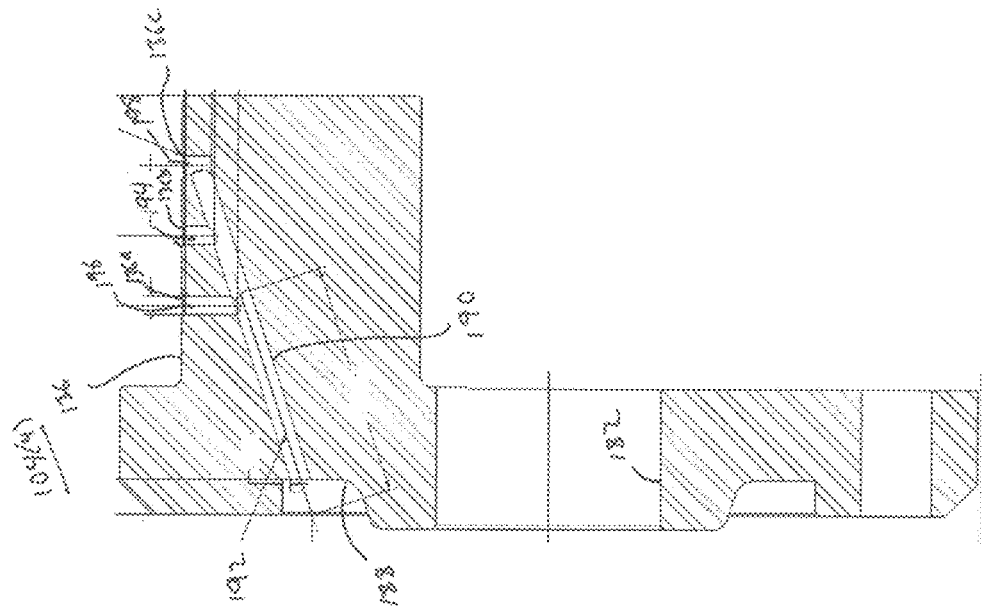
FIG. 7 is a cross sectional view of the crank throw of FIGS. 6A and 6B.

With further reference to FIG. 7, on a side 186 of the web 180 facing the center pin 108, an annular recess 188 surrounds the central aperture 182 and houses the oil slinger 130 therein. Fluidly coupled with the annular recess 188 is an oiling channel 190. The oiling channel 190 includes a first passage 192 extending from the annular recess 188 oblique to the axis of rotation A and a second passage 194 connected to the first passage 192 and connected to bearing surface 136 of the crank pin 110(4). As the throw 104(4) rotates, the oil slinger 130 distributes oil through the first passage 190 and the second passage 192 and directly to the bearing surface 136 of the crank pin 110(4).

Figure 8:
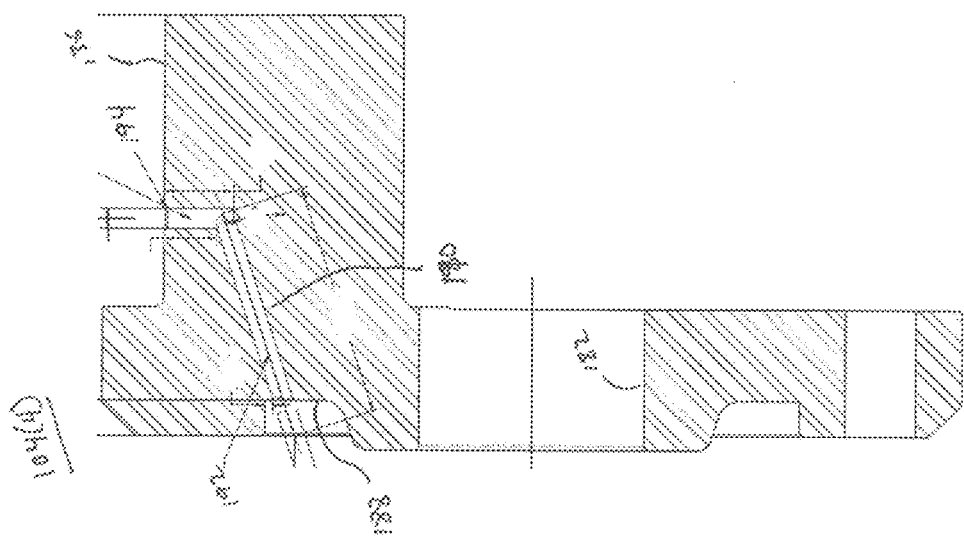
FIG. 8 is a cross sectional view of an alternative crank throw.

In the alternative embodiment illustrated in FIG. 8, the first passage 192 extends further along a length of the crank pin 110(4), connecting to second 194, third 196 and fourth 198 passages that directly lead to different positions on the bearing surface 136 of the crank pin 110(4). The second 194, third 196 and fourth 198 passages can be positioned to directly provide oil to components supported by the crank pin 110(4). For example, the second passage 194 can provide oil directly to a first position 136a of the bearing surface 136 (e.g., to the corresponding thrust washers), the third passage 196 can provide oil directly to a second position 136b of the bearing surface (e.g., to the connecting rod bearing) and the fourth passage 198 can provide oil directly to a third position 136c (e.g., to the corresponding thrust washers). By providing these separate passages, oil is directly fed to components supported by the crank pin 110(4) so as to provide quick distribution of oil to these components and thus reduce friction created by these components.

FIGS. 9-11 illustrates in detail the outer thrust washer 124. In one embodiment, the thrust washer 124 can be formed of bronze to provide increased thermal conductivity, resistance to wear, fatigue and deformation under load. The outer thrust washer 124 is formed of an annular body 200 that includes a plurality of grooves 202 (also can be referred to as slots) extending in a radial manner from the axis of rotation A for the crankshaft 100 and positioned about the annular body 200. The annular body 200 further defines bearing surfaces that include a first side surface 204, a second side surface 206, an inner annular surface 208 and an outer annular surface 210. On first side surface 204 of the outer thrust washer 124, three grooves 202(1)-(3) are uniformly distributed (i.e., spaced apart by 120 degrees about the annular body 200). On second side surface 206 opposite the first side 204, there are also three grooves 202(4)-(6) that are uniformly distributed (i.e., spaced apart by 120 degrees). The grooves 202(1)-(3) on the first side 204 and the grooves 202(4)-(6) on the second side 206 are staggered such that all of the grooves 202 on the first side 204 and the second side 206 are uniformly distributed (i.e., spaced apart by 60 degrees about the annular body 200). Stated another way, a first groove 202(1) on the first side 204 will be spaced apart 60 degrees from two grooves 202(4) and (6) on the second side 206. Any number of grooves can be provided on the outer thrust washer 124 and distributed throughout the outer thrust washer 124 in a variety of constructions. Regardless of the number of grooves or the distribution of the grooves, the grooves 202 operate to improve oil flow to bearing surfaces 204, 206, 208 and 210 of the outer thrust washer 124, thus decreasing drag and surface friction on the bearing surfaces.

Figure 13:
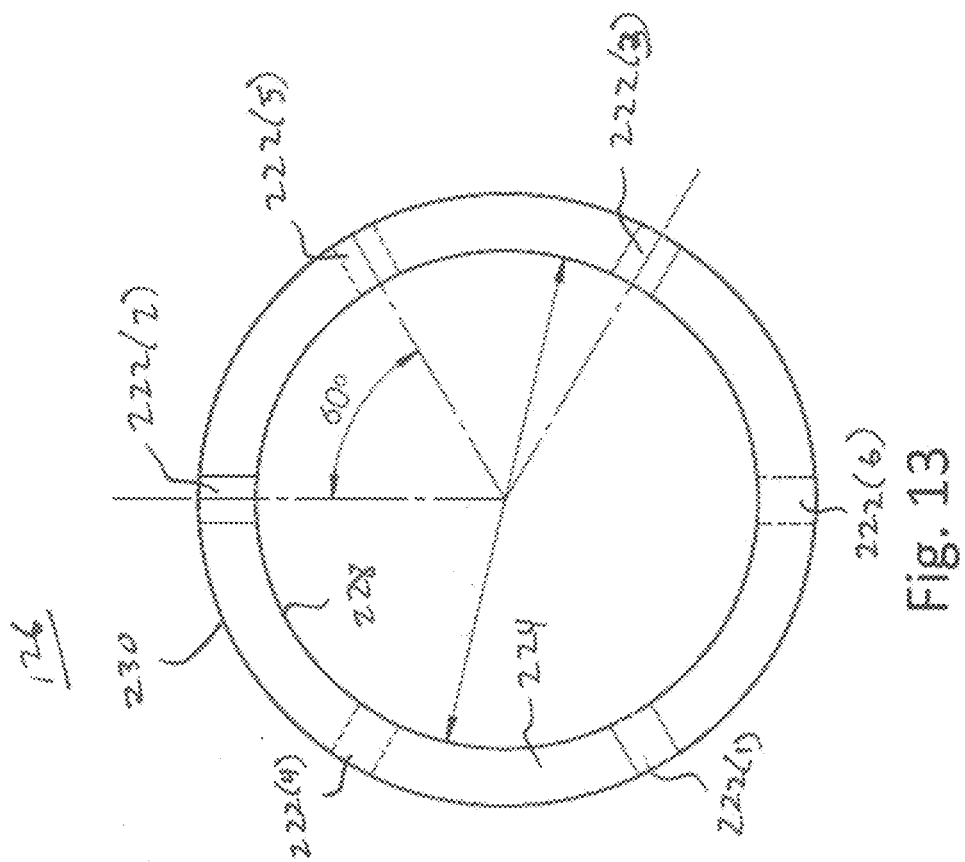
FIG. 13 is a plan view of the inner thrust washer of FIG. 12.
Figure 12:
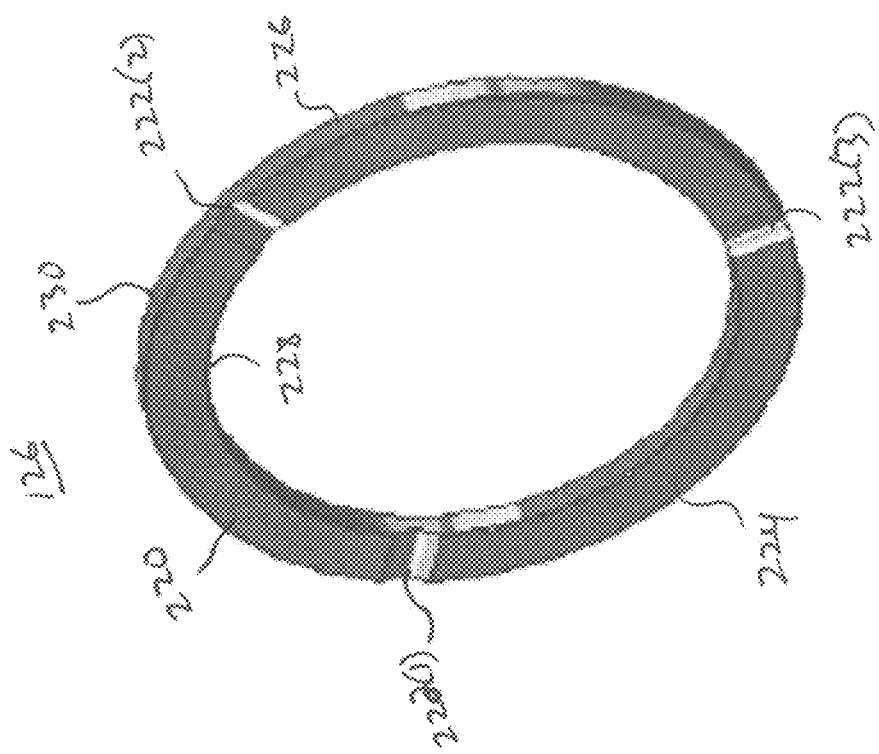
FIG. 12 is an isometric view of an inner thrust washer.

FIGS. 12-13 illustrate in detail the flat inner thrust washer 126, which is similar in construction to the outer thrust washer 124 although sized to fit within the outer thrust washer 124. The flat inner thrust washer 126 is formed of an annular body 220 that includes a plurality of grooves 222 (also can be referred to as slots) extending in a radial manner from the axis of rotation A for the crankshaft 100 and positioned about the annular body 220. The annular body 220 further defines bearing surfaces that include a first side surface 224, a second side surface 226, an inner annular surface 228 and an outer annular surface 230. On first side surface 224 of the flat inner thrust washer 126, three grooves 222(1)-(3) are uniformly distributed (i.e., spaced apart by 120 degrees). On second side surface 226 opposite the first side surface 224, there are also three grooves 222(4)-(6) that are uniformly distributed (i.e., spaced apart by 120 degrees). The grooves 222(1)-(3) on the first side surface 224 and the grooves 222(4)-(6) on the second side surface 224 are staggered such that all of the grooves 222(1)-(3) on the first side surface 224 and the second side surface 222(4)-(6) are uniformly distributed (i.e., spaced apart by 60 degrees). Stated another way, a first groove 222(1) on the first side surface 224 will be spaced apart 60 degrees from two grooves 222(4) and (6) on the second side surface 226. Any number of grooves 222 can be provided on the flat inner thrust washer 126 and distributed throughout the flat inner thrust washer 126 in a variety of constructions. Regardless of the number of grooves 222 or the distribution of the grooves 222, the grooves 222 operate to improve oil flow to bearing surfaces 224, 226, 228, 230 of the flat inner thrust washer 126, thus decreasing drag and surface friction on the bearing surfaces.

FIGS. 14-16 illustrate in detail the radius inner thrust washer 128, which is similar in construction to the flat inner thrust washer 126, where elements are similarly numbered. In contrast to the flat inner thrust washer 126, the radius inner thrust washer 128 includes an annular groove 240 on side surface 224 that is positioned closest to a corresponding pin throw and faces the pin throw, functioning to be concentric with a radius of connection between the crank pin 110 and corresponding web. The radius inner thrust washer 128 is formed of an annular body 220 that includes a plurality of grooves 222 (also can be referred to as slots) extending in a radial manner from the axis of rotation A for the crankshaft 100 and positioned about the annular body 220. The annular body 220 further defines bearing surfaces that include a first side surface 224, a second side surface 226, an inner annular surface 228 and an outer annular surface 230. On first side surface 224 of the radius inner thrust washer 128, three grooves 222(1)-(3) are uniformly distributed (i.e., spaced apart by 120 degrees). On second side surface 226 opposite the first side surface 224, there are also three grooves 222(4)-(6) that are uniformly distributed (i.e., spaced apart by 120 degrees). The grooves 222(1)-(3) on the first side surface 224 and the grooves 222(4)-(6) on the second side surface 224 are staggered such that all of the grooves 222(1)-(3) on the first side surface 224 and the second side surface 222(4)-(6) are uniformly distributed (i.e., spaced apart by 60 degrees). Stated another way, a first groove 222(1) on the first side surface 224 will be spaced apart 60 degrees from two grooves 222(4) and (6) on the second side surface 226. Any number of grooves 222 can be provided on the radius inner thrust washer 128 and distributed throughout the radius inner thrust washer 128 in a variety of constructions. Regardless of the number of grooves 222 or the distribution of the grooves 222, the grooves 222 operate to improve oil flow to bearing surfaces 224, 226, 228, 230 of the radius inner thrust washer 128, thus decreasing drag and surface friction on the bearing surfaces.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A crankshaft assembly having an axis of rotation, comprising:
    a main throw having a web, a main pin extending from the web that is coaxial with the axis of rotation and an aperture in the web;
    a crank throw having a web, a crank pin extending from the web, a central aperture positioned in the web that is coaxial with the axis of rotation, the crank pin positioned in the aperture of the main throw;
    a connecting rod positioned on the crank pin and including a connecting rod bearing positioned about a bearing surface of the crank pin;
    a first set of thrust washers positioned on the crank pin on a first side of the connecting rod, the first set of washers including a first inner thrust washer coaxially positioned within a first outer thrust washer; and
    a second set of thrust washers positioned on the crank pin on a second side of the connecting rod opposite the first side, the second set of washers including a second inner thrust washer coaxially positioned within a second outer thrust washer,
    wherein the main throw includes an annular recess surrounding the aperture on a side of the web opposite the main pin, wherein the first set of thrust washers are positioned in the annular recess, and the first outer thrust washer is arranged in contact with the connecting rod.

2. The crankshaft assembly of claim 1, wherein each of the washers in the first and second sets of washers include a plurality of grooves.

3. The crankshaft assembly of claim 2, wherein the plurality of grooves radiate from the axis of rotation.

4. The crankshaft assembly of claim 1, wherein the main throw further defines a groove extending from a side of the web toward the axis of rotation and fluidly coupled with the annular recess.

5. The crankshaft assembly of claim 1, wherein the crank pin defines an oiling channel having a first passage oblique to the axis of rotation, second, third and fourth passages fluidly coupled with the first passage and fluidly coupled with a bearing surface of the crank pin.

6. The crankshaft assembly of claim 1, wherein upon operation of the crankshaft, the first and second inner thrust washers are configured to rotate at a different speed from the outer thrust washers.

7. The crankshaft assembly of claim 1, wherein the inner and outer thrust washers of at least one of the first set and second set of thrust washers are configured to rotate at different speeds from each other.

\* \* \* \* \*